(12) United States Patent
Morishita (10) Patent No.: US 6,455,125 B1
(45) Date of Patent: Sep. 24, 2002

(54) METHOD OF MANUFACTURING A PAPER CORE MATERIAL HAVING A DESIGN OF CONTINUOUSLY GEOMETRIC PATTERN AND THE PAPER CORE MATERIAL MANUFACTURED BY THE METHOD

(75) Inventor: Michiko Morishita, Itabashi-ku (JP)

(73) Assignee: Dice Core Corporation, Tokyo (JP)

( * ) Notice: Subject to any disclaimer, the term of this patent is extended or adjusted under 35 U.S.C. 154(b) by 0 days.

(21) Appl. No.: 09/510,515

(22) Filed: Feb. 22, 2000

(51) Int. Cl.$^7$ ................................................. B32B 3/12
(52) U.S. Cl. ....................... 428/118; 428/116; 428/535; 428/537.5; 427/372.2; 427/439; 493/328; 493/329; 493/331; 493/379; 493/380; 493/381; 493/405; 493/966; 162/135; 162/158; 162/159; 162/160; 162/161; 162/196; 162/231
(58) Field of Search .................................. 428/116, 117, 428/118, 408, 534, 535, 537.5; 493/328, 329, 331, 394, 379, 380, 381, 405, 966; 162/13, 135, 158, 159, 160, 161, 196, 202, 204, 231; 427/372.2, 381, 382, 430.1, 439

(56) References Cited

U.S. PATENT DOCUMENTS 3,638,573 A * 2/1972 Campbell

OTHER PUBLICATIONS

A Utilization Dictionary of Wood Charcoal and Vinegar; Written by Ginji Sugiura et al. and supervised by Sadakichi Kishimoto; Published by Kabushiki Kaisha Sorinsha on Dec. 20, 1997; p. 58, (Abridged English Translation).

How to prevent toxic home syndrome by wood charcoal power; Written by Akira Ohtsuki and published by Kabushiki Kaisha Sorinsha on Apr. 30, 1997; pp. 120, 126 and 127, (Abridged English Translation).

Japanese Patent Publication No. 20981/1981;Tadao Nagai, Kohda–machi, Aichi Prefecture, Japan; "A method of manufacturing a core material by a paper core", pp. 97–99, (Abridged English Translation). No Month.

A building knowledge (Nov. issue in 1994); Published by Kabushiki Kaisha Building Knowledge; "A tatami mat comprising a sheet of wood charcoal granule sandwiched between straw mats in order to form a comfortable living space by a natural purifying power", pp. 101–102, (Abridged English Translation).

"A powerful enemy to a house; it is a deterioration from humidity from below the floor, corrosion, moulds and termites". No Date.

* cited by examiner

Primary Examiner—Deborah Jones
Assistant Examiner—Wendy Boss
(74) Attorney, Agent, or Firm—Wenderoth, Lind & Ponack, L.L.P.

(57) ABSTRACT

A method for manufacturing a paper core material is described. The paper core material has uses such as in the building industry and has the advantage that no toxic home syndrome is caused in a newly built house or office. The paper core material has a continuous geometric pattern such as rectangular or hexagonal cells and is made by the method of providing a plurality of base paper strips, bending and gluing the base paper strips to form the paper core material having a continuous geometric pattern, treating the paper core material with a charcoal solvent comprising activated carbon dust, wood vinegar and a flame-resisting agent, and drying the paper core material. An alternate method is provided which involves treating the base paper strips with the charcoal solvent, drying the base paper strips, and then bending and gluing the base paper strips to form the paper core material having a continuous geometric pattern. Paper core materials produce thereby, and articles of manufacture produce therefrom, are also described.

18 Claims, 7 Drawing Sheets

METHOD OF MANUFACTURING A PAPER CORE MATERIAL HAVING A DESIGN OF CONTINUOUSLY GEOMETRIC PATTERN AND THE PAPER CORE MATERIAL MANUFACTURED BY THE METHOD

BACKGROUND OF THE INVENTION

1. Field of the Invention

This application relates to a method of manufacturing a paper core material, and the paper core material made by the method. More particularly, this invention relates to a method of manufacturing a paper core material containing a mixture of activated carbon dust, wood vinegar and aluminum hydroxide and having a design of a continuous geometric pattern which can be widely used for building and fitting materials and electrical appliances.

2. Description of the Prior Art

Many plywood sheets are used in the building and fitting materials. The plywood sheets are glued together by an adhesive containing formaldehyde.

There are plenty of toxins in building and fitting materials of a newly built house and office. Toxic house syndrome is mainly caused by formaldehyde contained in the adhesive of the building and fitting materials. Formaldehyde is a cancer causing substance.

It is reported recently that more than 90% of all accelerated poisonings happen in the house, and 55% greater cancer rate for housewives than women who work outside the home is reported too.

It is well known that charcoal has its various effects such as production of a negative ion and a far-infrared radiation, deodorization, shielding of an electromagnetic wave, and a temperature control.

It is recognized that wood vinegar has a preserving effect, which is proposed to be used for an activation agent for health, forming a comfortable living space and for multi-layered building materials, and some of them have been partially put into practice.

SUMMARY OF THE INVENTION

A primary object of this invention is to provide a method of manufacturing a paper core material containing a mixture of activated carbon dust, wood vinegar and aluminum hydroxide and having a design of a continuous geometric pattern which can be widely used as a core material in building and fitting materials and electrical appliances.

Another object of this invention is to provide a method of manufacturing a paper core material whereby the paper core material is immersed into a charcoal solvent to permeate activated carbon dust fully into the paper core material and then it is dried in order to obtain a design of a continuous geometric pattern.

Another object of this invention is to provide a method of manufacturing a paper core material whereby the paper core material is immersed into a charcoal solvent containing activated carbon dust and wood vinegar to permeate the carbon dust fully into the paper core material and then it is dried in order to obtain a design of a continuous geometric pattern.

Another object of this invention is to provide a method of manufacturing a paper core material whereby the ordinarily made paper core material is immersed into a charcoal solvent containing a flame-resisting agent to permeate the carbon dust fully into the paper core material and then it is dried in order to obtain a design of a continuous geometric pattern.

Another object of this invention is to provide a method of manufacturing a paper core material containing activated carbon dust and wood vinegar and having a design of a continuous geometric pattern which is manufactured without using an adhesive containing a chemical substance such as formaldehyde.

Another object of this invention is to provide a method of manufacturing a paper core material containing activated carbon dust and wood vinegar and having a design of a continuous geometric pattern which can be used as a core material in building and fitting materials whereby a comfortable, safe and airtight house and office can be built, thus causing no toxic house syndrome.

Another object of this invention is to provide a method of manufacturing a paper core material containing a mixture of activated carbon dust and wood vinegar and having a humidity adjusting function whereby the generation of a mold, tick, termite and bacterium can be prevented in order to provide a comfortable and safe living space and environment.

Another object of this invention is to provide a method of manufacturing a paper core material containing a mixture of activated carbon dust and wood vinegar and having a humidity adjusting function whereby the carbon dust and wood vinegar are fully permeated into the paper core material in the step of either making the base paper strips or forming a paper core material with the base paper strips in order to provide a comfortable and safe living space and environment.

Another object of this invention is to provide a method of manufacturing a paper core material containing activated carbon dust having a humidity adjusting function whereby wood vinegar and flame-resisting agent are fully mixed into water used in a step of manufacturing a base paper strip.

Another object of this invention is to provide a method of manufacturing a paper core material containing activated carbon dust whereby a flame-resisting performance of a building and fitting material can be remarkably increased.

Another object of this invention is to provide a method of manufacturing a paper core material which has a geometrically pattern is a honeycomb structure.

Another object of this invention is to provide a method of manufacturing a paper core material, which can be used as a filter of an electrical appliance.

Another object of this invention is to provide a method of manufacturing a paper core material, which can be used as heartwood of an inner wall of a refrigerator.

Another object of this invention is to provide a method of manufacturing a paper core material whereby purification of air in a house or office is accelerated by a negative ion to always maintain a clean and safe space and environment.

Another object of this invention is to provide a method of manufacturing a paper core material whereby frequency in use of an air conditioner or humidifier can be decreased in order to save energy.

Still another object of this invention is to provide a paper core material whereby not only an electromagnetic wave which is always being radiated from an inner portion of the electrical appliance, but also static electricity can be shielded.

DETAILED DESCRIPTION OF THE PREFERRED EMBODIMENT

This invention provides an improved method of manufacturing a paper core material comprising a mixture of activated carbon dust, wood vinegar an aluminum hydroxide and having a continuous geometric pattern which can be widely used for building and fitting materials and electrical appliance.

Other features, advantages and objects of this invention will become apparent with reference to the following description and accompanying drawings.

DETAILED DESCRIPTION OF THE PREFERRED EMBODIMENT

EXAMPLE 1

Figure 1:
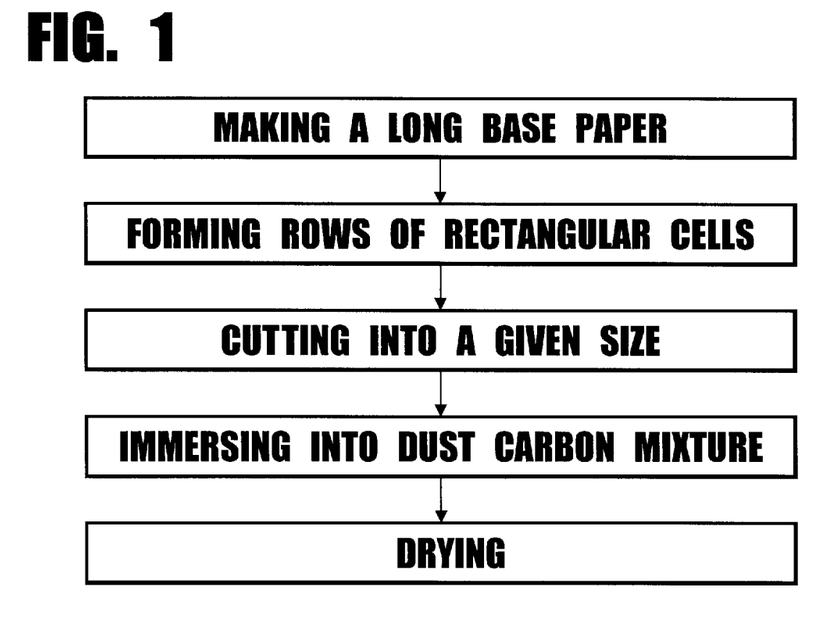
FIG. 1 is a block diagram showing a first method of manufacturing a paper core material having a design of rectangular cells of this invention, showing that carbon dust is permeated into the paper core material after it has been made.

As shown in FIG. 1, a slurry substantially consisting of wood pulp is made into a base paper strip 10 by a paper making method at a temperature of 20° C. and at a humidity of 65% and dried, the base paper strip 10 having a length of 3000 mm, a width of 1100 mm and a thickness of mm/1000.

Figure 7:
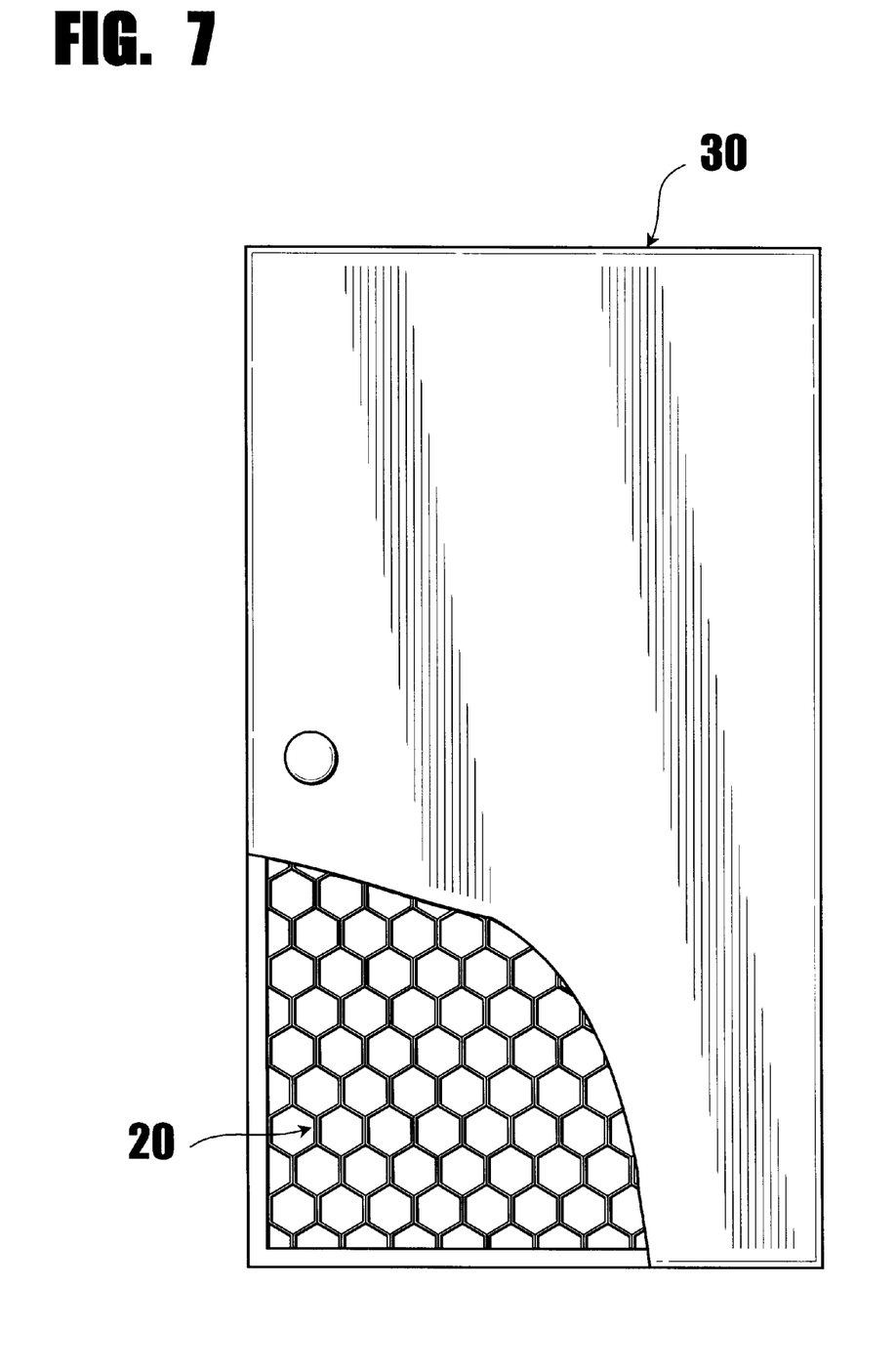
FIG. 7 is a front view, partly in section, of a door having rows of paper core material.
Figure 8:
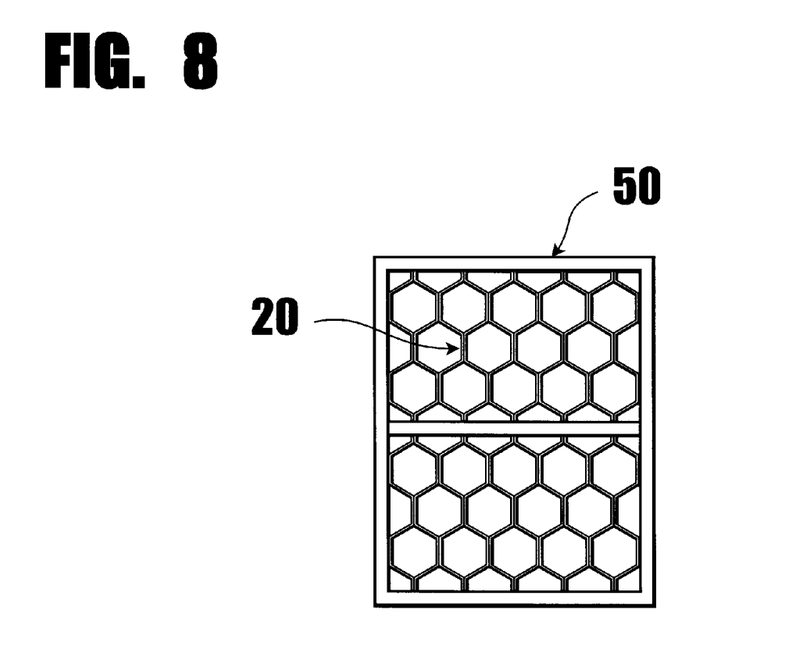
FIG. 8 is a simplified front view of hexagonal paper core material used for a filter of an electrical appliance.
Figure 9:
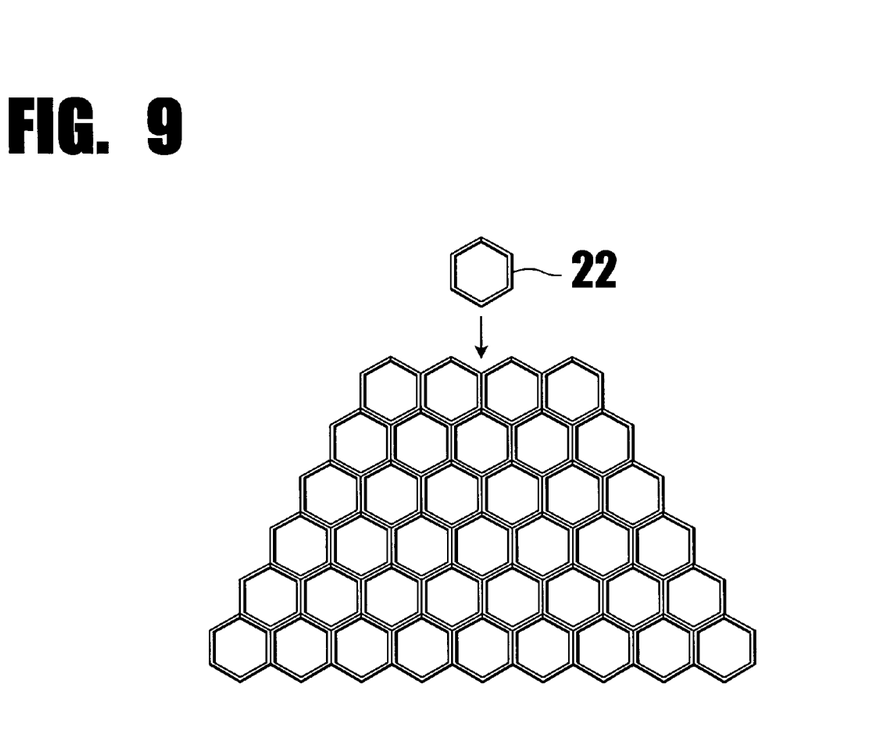
FIG. 9 is a front view showing that a number of the hexagonal cells are assembled into a hexagonal paper core material.
Figure 10:
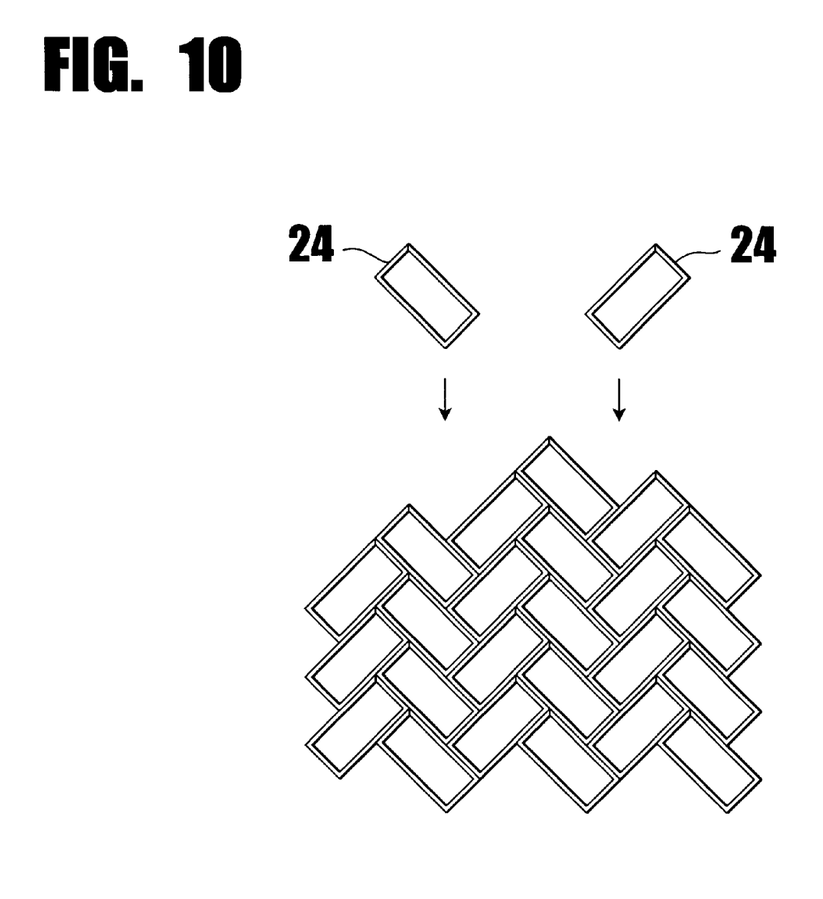
FIG. 10 is a similar front view showing that a number of rectangular cells are assembled into a rectangular paper core material.

The base paper strip 10 is bent alternately with a given length 10a, 10a . . . to form rows of rectangular or hexagonal cells one after another which are laminated and glued together, and subsequently immersed into a mixture containing 75% by weight of a wood slurry pulp of a solid content, 10–15% of activated carbon dust, 10–15% of wood vinegar and 0.9–1.2% of aluminum hydroxide and then it is dried to form a paper core material 20, which is used as a core material in a building material such as a door 30 shown in FIG. 7.

EXAMPLE 2

Figure 2:
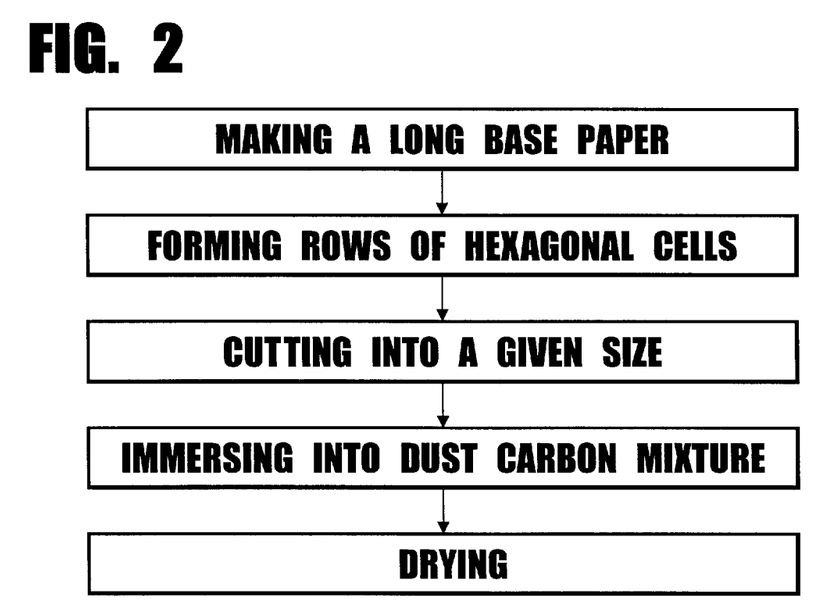
FIG. 2 is a similar block diagram showing a second method of manufacturing a paper core material having a design of hexagonal cells of this invention.
Figure 3:
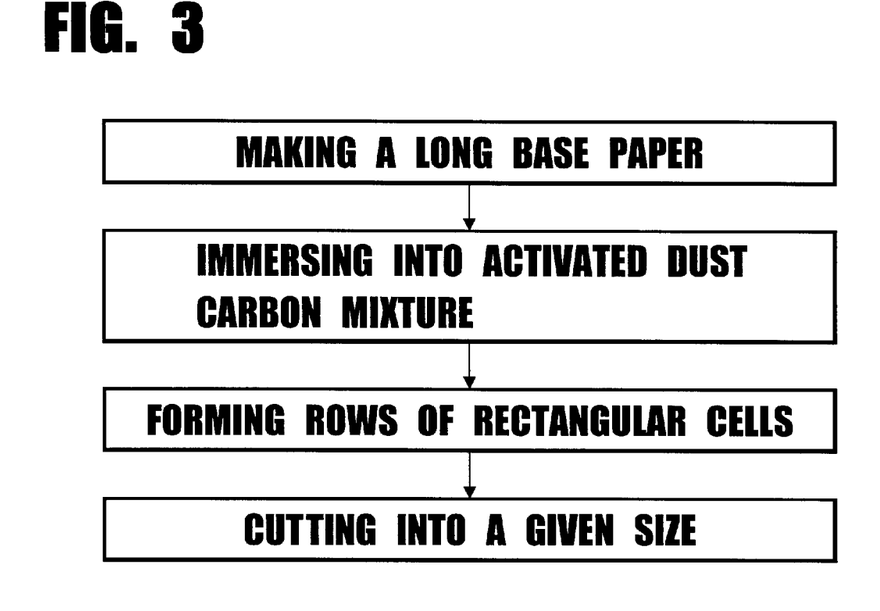
FIG. 3 is a similar block diagram showing a third method of manufacturing a paper core material having a design of rectangular cells of this invention; showing that carbon dust is permeated into the paper core material before it is formed into rows of rectangular cells.
Figure 4:
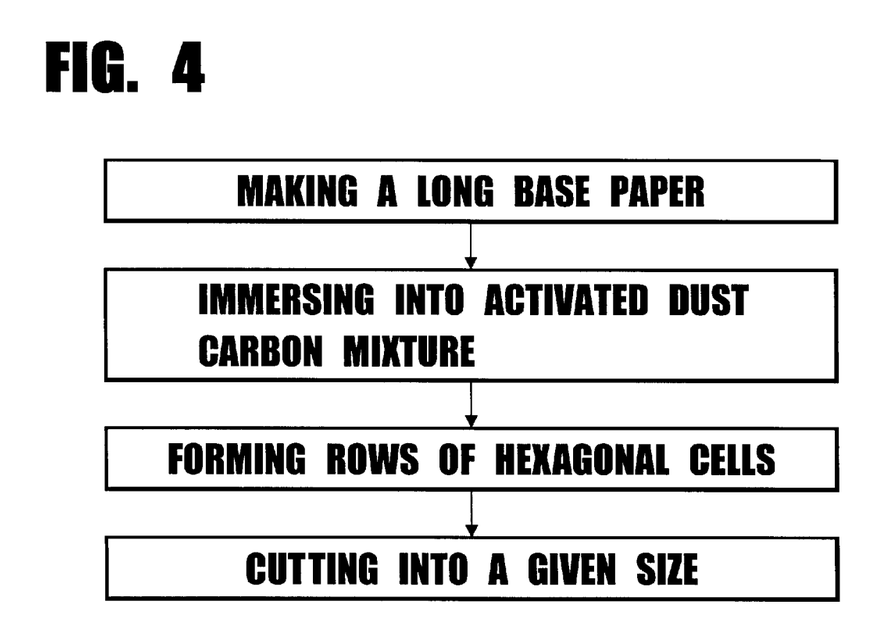
FIG. 4 is a similar block diagram showing a fourth method of manufacturing a paper core material having a design of hexagonal cells of this invention; showing that carbon dust is permeated into the paper core material before it is formed into rows of hexagonal cells.
Figure 5:
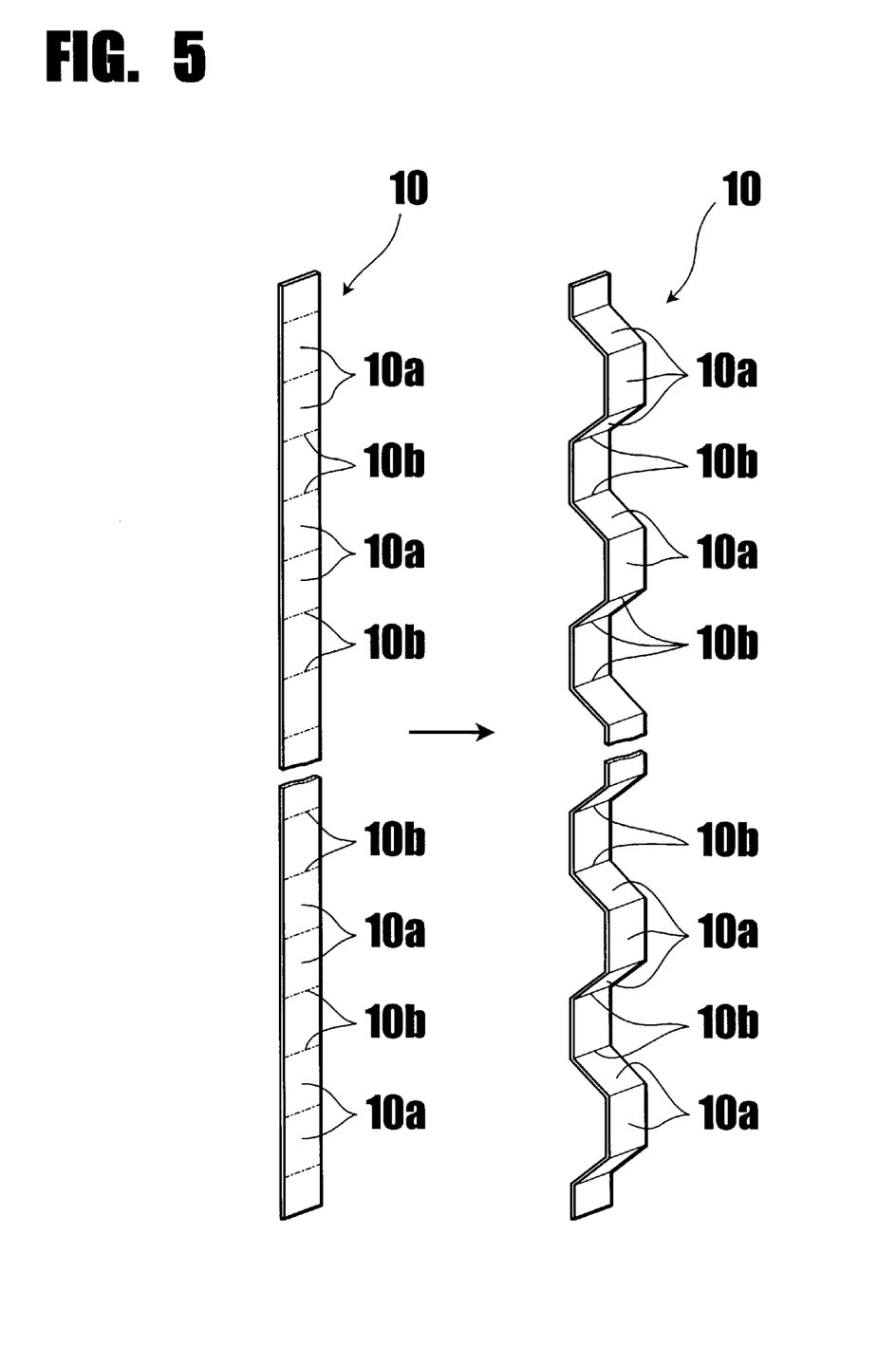
FIG. 5 is a perspective view, partly in section, of a straight paper core an the folded paper core sheets which are being glued at alternate side portions to form rows of hexagonal cells.
Figure 6:
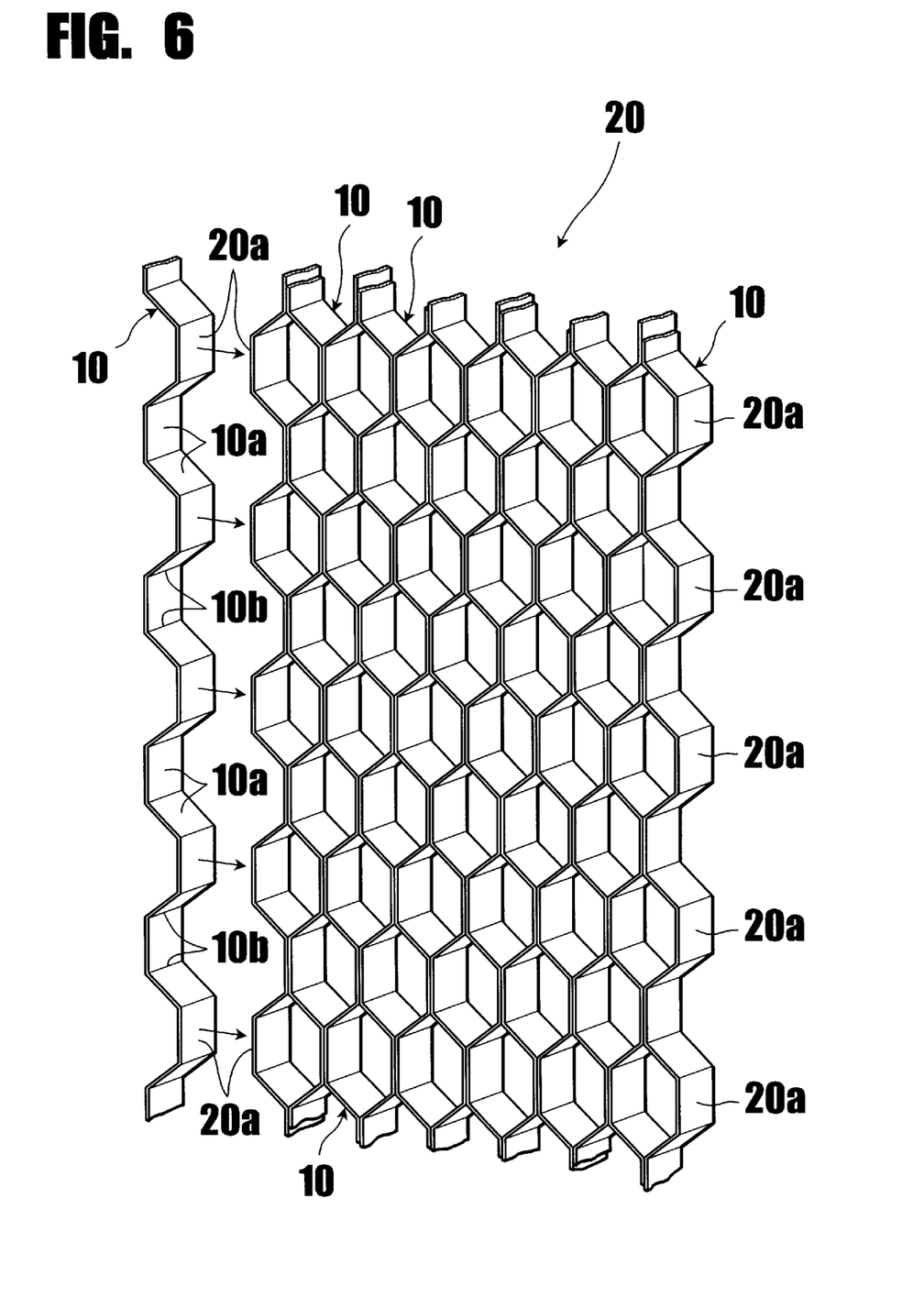
FIG. 6 is a partial perspective view of paper core material having rows of hexagonal cells, which are being glued at alternate side portions.

As shown in FIGS. 2, 5 and 6, the base paper strip 10 is folded along the folds 10b and 10b at regular intervals into rows of hexagonal cells.

The alternate side portions 20a and 20a are laminated one after another and glued together, subsequently immersed into a solvent mixture containing 75% by weight of a wood slurry pulp of a solid content, 10 15% of activated carbon dust, 10–15% of wood vinegar and 0.9–1.2% of aluminum hydroxide and then it is dried to form a paper core material 20, which is used as a core material in a building material such as a door 30.

The test results of paper quality manufactured by the methods shown in EXAMPLES 1 and 2 are shown in the following tables.

TABLE 1

(TEST RESULTS OF PAPER QUALITY)
The test was carried out on the item of T-Funen by the method B of JIS A 1322 (Japanese Industrial Standards), and a heating time was 2 minutes.

| quantity (g/m) | thickness (mm/1000) | density (g/m) | width (250 squ.m) tensile strength length side | length (3000 mm) |
|---|---|---|---|---|
| 260 | 300 | 0.87 | 12.0    5.4 | 100 |

TABLE 2

(TEST RESULTS OF PAPER QUALITY)
The test was carried out on the item of JST 11P by the method B of JIS A 1322 (Japanese Industrial Standards), and a heating time was 2 minutes.

| test time flame-resisting | length | side |
|---|---|---|
| time (second) dust-remaining | 0.0 | 0.0 |
| time (second) carbonized | 0.0 | 0.0 |
| length (cm) | 4.8 | 4.9 |
| kind | 1st class flame-resisting property | 1st class flame-resisting property |

If desirable, the mixture containing 75% by weight of a wood pulp slurry of a solid content, 10–15% of activated carbon dust, 10–15% of wood vinegar and 0.9–1.2% of aluminum hydroxide is coated on the surface of the paper core material, and dried.

While a preferred embodiment of the invention has been disclosed in detail, it should be understood by those skilled in the art that various modifications may be made to the illustrated embodiment without departing from the scope as described in the specification and defined in the appended claims.

What I claim is:

1. A method of manufacturing a paper core material having a continuous geometric pattern, which comprises the steps of:

providing a plurality of base paper strips;

bending and gluing said plurality of base paper strips to form a paper core material having a continuous geometric pattern;

treating said paper core material with a charcoal solvent comprising activated carbon dust, wood vinegar and a flame-resisting agent to permeate said paper core material with at least said activated carbon dust; and drying said paper core material.

2. The method of claim 1, wherein said continuous geometric pattern has rows of rectangular cells.

3. The method of claim 1, wherein said continuous geometric pattern has rows of hexagonal cells.

4. The method of claim 1, wherein said charcoal solvent comprises 75% wood pulp slurry, 0.9–1.2% of aluminum hydroxide, 10–15% wood vinegar and 10–15% activated carbon dust.

5. The method of claim 1, wherein said paper core material is equally permeated with said activated carbon dust and said flame-resisting agent.

6. The method of claim 1, wherein said paper core material is a honey-comb construction.

7. The method of claim 1, wherein said paper core material is treated by immersing or coating said paper core material with the charcoal solvent.

8. A method of manufacturing a paper core material having a continuous geometric pattern, which comprises the steps of:

providing a plurality of base paper strips;

treating said plurality of base paper strips with a charcoal solvent comprising activated carbon dust, wood vinegar and a flame-resisting agent to permeate said plurality of base paper strips with at least said activated carbon dust;

drying said plurality of base paper strips; and bending and gluing said plurality of base paper strips to form a paper core material having a continuous geometric pattern.

9. The method of claim 8, wherein said continuous geometric pattern has rows of rectangular cells.

10. The method of claim 8, wherein said continuous geometric pattern has rows of rectangular cells.

11. The method of claim 8, wherein said charcoal solvent comprises 75% wood pulp slurry, 0.9–1.2% of aluminum hydroxide, 10–15% wood vinegar and 10–15% activated carbon dust.

12. The method of claim 8, wherein said paper core material is equally permeated with said activated carbon dust and said flame-resisting agent.

13. The method of claim 8, wherein said paper core material is a honey-comb construction.

14. The method of claim 8, wherein said plurality of base paper strips are treated by immersing or coating said plurality of base paper strips with the charcoal solvent.

15. A paper core material which is manufactured by the method of claim 1.

16. A paper core material which is manufactured by the method of claim 8.

17. An article of manufacture comprising the paper core material of claim 15.

18. An article of manufacture comprising the paper core material of claim 16.

* * * * *